UNITED STATES PATENT OFFICE.

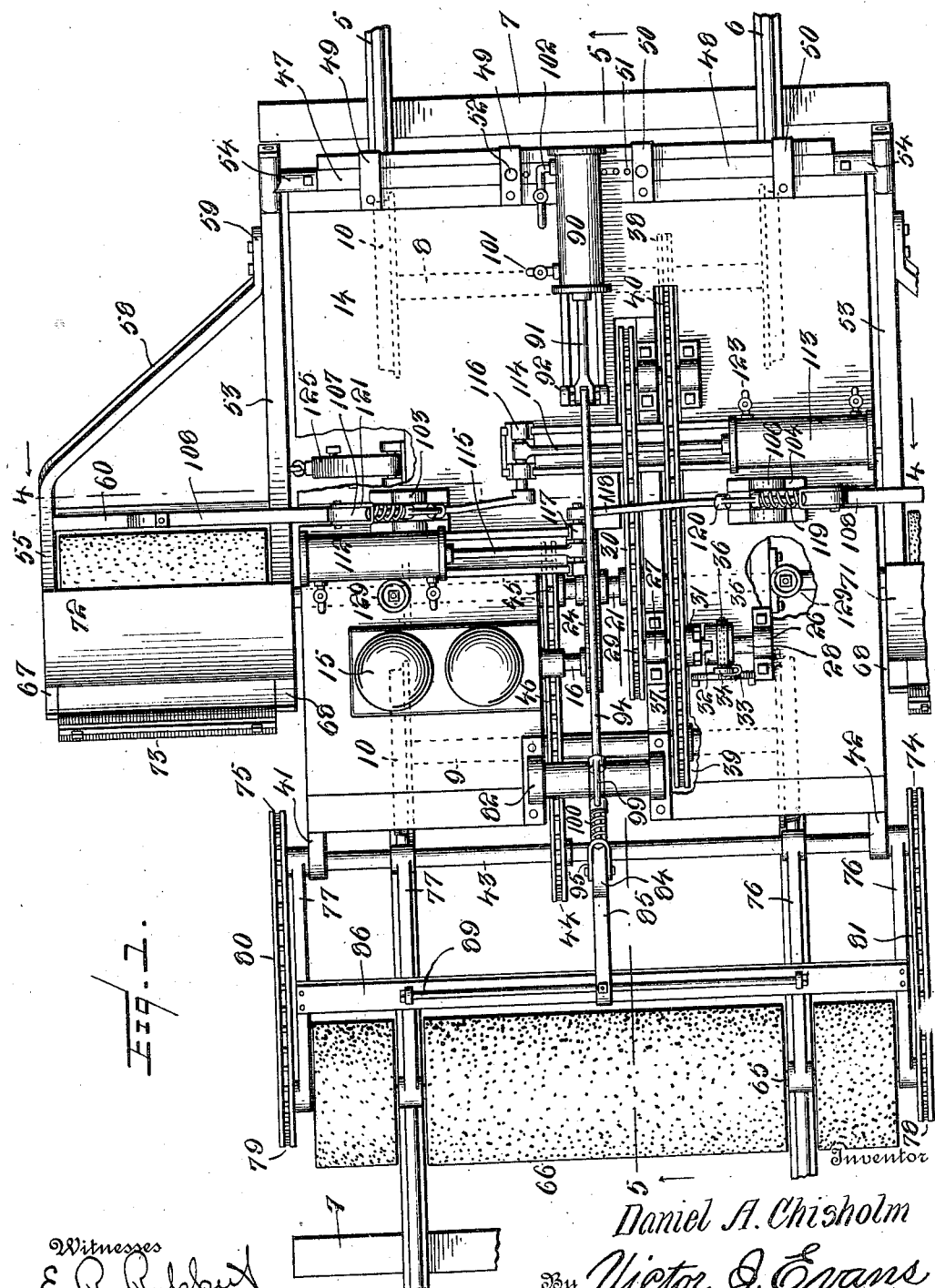

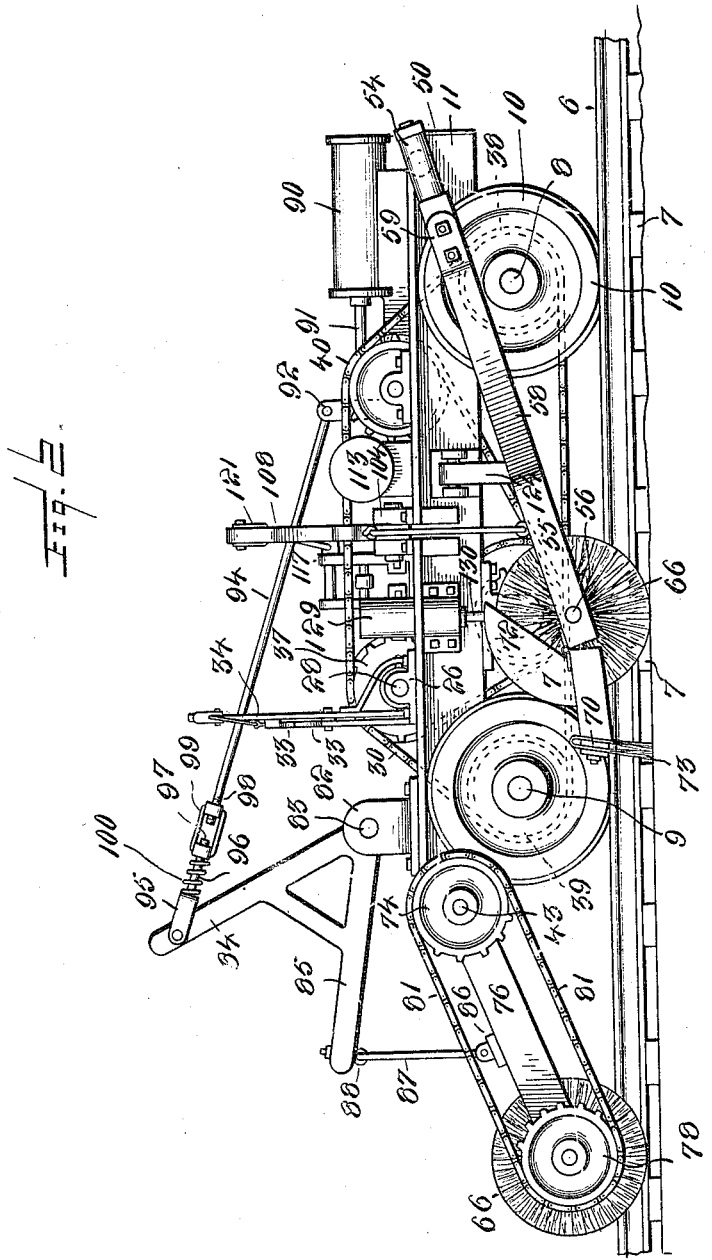

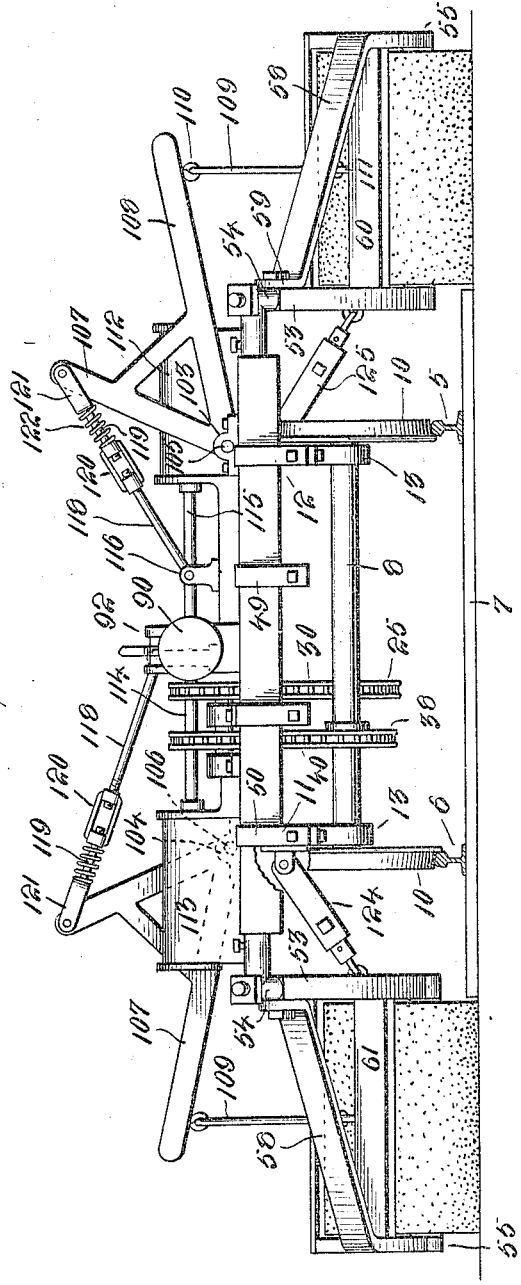

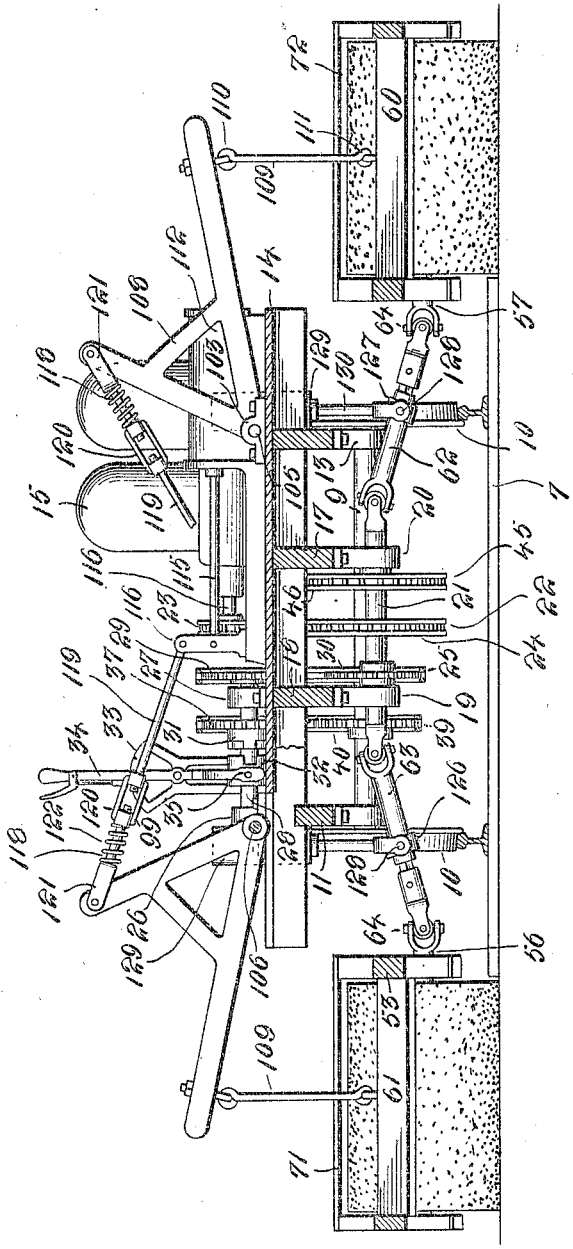

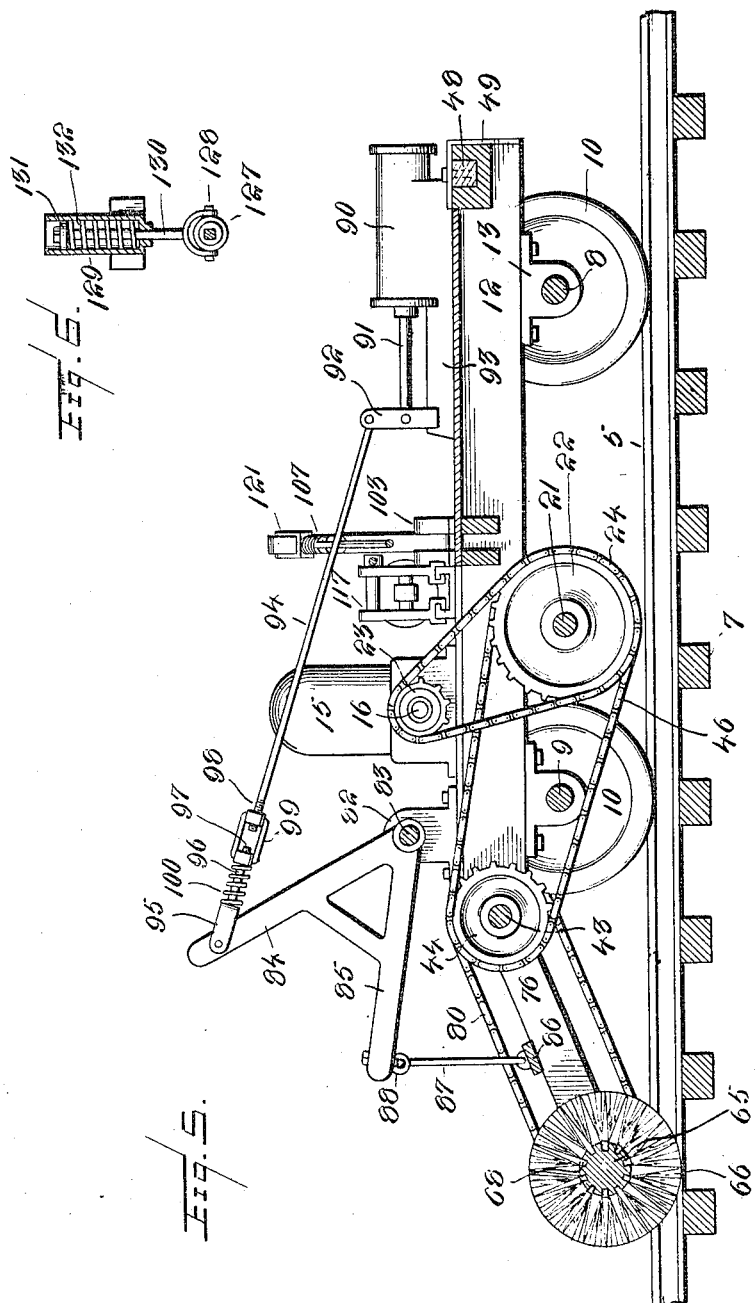

DANIEL AUGUSTINE CHISHOLM, OF GILBY, NORTH DAKOTA.

TRACK-WEEDER.

972,058.   Specification of Letters Patent.   Patented Oct. 4, 1910.

Application filed April 29, 1910. Serial No. 558,345.

*To all whom it may concern:*

Be it known that I, DANIEL AUGUSTINE CHISHOLM, a born American citizen of the United States, residing at Gilby, in the county of Grand Forks and State of North Dakota, have invented new and useful Improvements in Track-Weeders, of which the following is a specification.

This invention relates to improvements in weeders and more particularly to the type employed for removing weeds from railways.

One object of the invention is the provision of a weeder provided with means for removing weeds from the ground lying beyond the opposite ends of the cross ties and further provided with means for removing the weeds from the spaces between the cross ties and on either side of the rails.

Another object is the provision of a wheeled support provided with a plurality of weeders and a motor for operating the weeders and propelling the support.

A still further object is the provision of a means whereby the support may be propelled and the weeders rendered inoperative.

A further object is the provision of a support provided with a plurality of weeders and means connecting the weeders with the support and operating to yieldingly hold the weeders in engagement with the ground so that when uneven places are met with the weeders will yield automatically, whereby jarring of the support and inability of the weeders to remove weeds from depressions will be eliminated.

A still further object is the provision of a means for moving the weeders upwardly and out of engagement with the ground whenever desired.

With these and other objects in view, which will more fully hereinafter appear, the present invention consists in certain novel details of construction and arrangement of parts, hereinafter fully described, illustrated in the accompanying drawings and more particularly pointed out in the appended claims; it being understood that various changes in the form, proportion, size, and minor details of the device may be made, within the scope of the appended claims, without departing from the spirit or sacrificing any of the advantages of the invention.

In the accompanying drawings, forming a part of the specification;—Figure 1 is a plan view of the device. Fig. 2 is a side elevation thereof. Fig. 3 is a front end view. Fig. 4 is a sectional end view on the line 4—4 of Fig. 1 and looking in the direction of the arrows. Fig. 5 is a longitudinal sectional view on the line 5—5 of Fig. 1 and looking in the direction of the arrows. Fig. 6 is a detail side elevation partly in section of the means for yieldingly holding the movable shaft weeders in proper position.

Similar numerals of reference are employed to designate corresponding parts throughout.

The rails of the track are designated by the numerals 5 and 6, and the cross ties connecting the said rails by the numeral 7.

The device forming part of the subject matter of the present invention comprises a support, the said support including in its construction a pair of spaced axles 8 and 9, to the opposite ends of which are secured flanged wheels 10 to bear upon the rails 5 and 6. The wheels and their axles support a body which includes a pair of sides 11 and 12, the said sides being provided with boxings 13 to receive the axles 8 and 9, the said sides being connected by means of a platform 14.

Positioned on the platform 14 and to one side of the central line thereof and adjacent to the rear end of the platform is a hydrocarbon motor designated by the numeral 15, the main shaft of this motor extending toward the longitudinal central line of the platform and designated by the numeral 16. Depending from the lower face of the platform 14 and located at the middle and on opposite sides of the longitudinal central line thereof are a pair of hangers 17 and 18, the lower ends of which are provided with boxings 19 and 20 in which are journaled the opposite end portions of a shaft 21, considerably less in length than the distance between the rails 5 and 6. It will be seen now by reference to Figs. 1, 3 and 4 of the drawings that keyed to the middle portion of the shaft 21 is a sprocket wheel 22, and keyed to the free end portion of the main shaft 16 of the motor is a similar sprocket 23 in alinement with the sprocket 22, connection between said sprockets being established by means of a sprocket chain 24.

By referring again to the drawings and more especially to Figs. 1, 2, 3 and 4 it will be seen that keyed adjacent to one end of the shaft 21 is a sprocket 25. Journaled in boxings 26 and 27 arranged on the upper face of the platform 14 is a shaft 28, one end of which extends to a point adjacent to the shaft 16 of the motor and is provided with a sprocket wheel 29 in alinement with the sprocket wheel 25, connection between said sprockets being established by means of a sprocket chain 30. The sprocket wheel 29 is keyed on the shaft 28 and journaled on the shaft and adjacent to the sprocket 20 is a similar sprocket 37 the hub portion of which is provided with a clutch member 31. Splined on the shaft 28 is a clutch collar 32. An upstanding rack is designated by the numeral 33 and fulcrumed on this rack is an intermediate portion of a lever 34, the lower end of which is provided with an inwardly extending pin 35 which is received by an annular groove 36 formed in the clutch collar 32. Thus it will be seen when the shaft 28 rotates and the clutch surfaces of the collar and member are in engagement that the sprocket wheel 37 will be also rotated. Keyed to the axles 8 and 9 are sprocket wheels 38 and 39, in alinement with the sprocket wheel 37 and trained over the sprockets 37, 38 and 39 is an endless sprocket chain 40, which serves to rotate the wheels when the clutch surfaces of the collar 32 and member 31 are in engagement and thus propel the support.

Extending beyond the rear end of the platform 14 and located at the opposite sides thereof are a pair of boxings 41 and 42 and journaled in these boxings are the opposite ends of a horizontally disposed shaft 43. Keyed to the intermediate portion of the shaft 43 is a sprocket wheel 44, and keyed to the shaft 21 and adjacent to the end thereof remote from the sprocket wheel 25 is a similar sprocket wheel 45, in alinement with the sprocket wheel 44 and trained over these sprockets is an endless sprocket chain 46.

With this construction it will be manifest when the hydro-carbon motor is in operation that movement will be imparted to the shaft 21 through the sprocket chain 24 and as before described similar movement will be imparted when the clutch surfaces are in engagement with the bearing wheels and so also will rotary movement be imparted to the shaft 43 through the sprocket chain 46.

By referring now to Fig. 1 it will be seen that slidingly fitted in the forward end of the platform are a pair of slide bars 47 and 48. The slide bars 47 and 48 are arranged in a transverse groove in the forward end of the platform and are held against displacement by means of guides 49 and 50, which are shown to be formed of single pieces of sheet metal and bearing on the upper sides of the slide bars. The combined lengths of the slide bars are somewhat greater than the width of the platform and formed in the upper faces of the slide bars are a plurality of spaced openings 51 which are adapted to independently aline with openings 52 in the guides 49 and 50, and when so alining to receive pins which prevent movement of the bars. With this construction it will be manifest that the slide bars 47 and 48 may be extended certain distances beyond the opposite sides of the platform.

A pair of frames are shown to include side bars 53 corresponding in length to approximately one-half the length of the platform 14. The forward ends of these side bars 53 are provided with lateral tubular extensions 54 which receive the free ends of the slide bars 47 and 48, and it will be evident with this construction that the side bars may be moved vertically on the slide bars 47 and 48 as pivots. The frames are likewise provided with side bars 55, the latter at their rear ends being connected to the side bars 53 by means of transversely disposed shafts 56 and 57, the said shafts being journaled in the side bars 53 and 54 and having their inner ends extending beyond the inner faces of the side bars 53. The forward end portions of the side bars 55 are offset inwardly as shown at 58, and are terminally secured as shown at 59 to the forward end portions of the side bars 53, the said side bars 53 and 55 being further connected at their medial portions by cross bars 60 and 61 arranged in advance of the shafts 56 and 57.

By reference now to Fig. 4 it will be seen that the opposite end portions of the shaft 21 are bifurcated so also are the inner ends of the shafts 56 and 57. Connection between the shafts 56 and 57 and opposite ends of the shaft 21 are established by means of shaft sections 62 and 63, the opposite ends of which are bifurcated similar to the shaft sections 21, 56 and 57. The bifurcated ends of the shafts are connected by cross-shaped couplings 64 of well-known construction the terminals of said cross-shaped couplings acting as trunnions which are loosely fitted in openings in the bifurcations of the shaft. With this construction it will be manifest that universal joints are established between the shaft sections 56 and 57 and shaft 21.

The shafts 56 and 57 carry the weeders and if desired the said shafts may be longitudinally grooved similar to the shaft 65 shown in Fig. 5, these grooves receiving the weeder prongs 66 which are preferably formed of strips of sheet metal bent upon themselves at their intermediate portions and insertible into the grooves and held therein by means of strips 68.

It might here be stated that the shaft sections 62 and 63 extend to points adjacent to the opposite ends of the cross ties 7 and by virtue of the widths of the frames before described it will be evident that the weeders carried by said frames will operate on the surface beyond the opposite ends of the cross ties so that during the operation of the device the weeds will be removed from the surface beyond the opposite ends of the cross ties.

In order to prevent the weeds uprooted by the weeders just described from being tossed upwardly the side members 53 and 55 are at their rear ends provided with hinged extensions 67 and 68, the rear ends of which are connected by cross bars 70. Secured to the extensions 68 and 69 are hoods 71 and 72, which overlie the upper and rearward segments of the weeders and act as deflectors or guards for the weeds thrown upwardly by the weeders. The cross bars 70 are provided with sweepers 73 which operate to gather the uprooted weeds into piles, of certain dimensions, it being evident, owing to the pivotal mounting of the sections 67 and 68 that the said sections will move upwardly to permit disengagement of the sweepers from the weeds after the latter have gathered the weeds into piles of required dimensions.

The shaft 43 at the rear end of the platform is provided at its opposite ends with sprockets 74 and 75 and projecting downward and rearwardly from the opposite end portions of the shaft 43 and located between the boxings 41 and 42 and between the sprockets 74 and 75 are hanger arms 76 and 77, the rear ends of which are connected by the shaft 65, before described. The opposite ends of the shaft 65 extend beyond the outer faces of the hanger arms 76 and 77 and are provided with sprockets 78 and 79 in alinement with the sprockets 74 and 75, connection between the said sprockets being established by means of sprocket chains 80 and 81.

When it is understood that the width of the platform 14 corresponds approximately to the length of the cross ties it will be evident that the weeders on the shaft 65 will operate in the spaces between the cross ties on either side of the rails, thus removing the weeds therefrom.

From the foregoing it will be manifest when the hydro-carbon motor is in operation that the device may be propelled thereby and the weeds simultaneously removed from the surfaces before stated. In practice, however, I deem it better to couple the device with a tool car or the like driven by a locomotive so that when working through thick patches of grass and weeds the strain will be taken from the engine.

When the device is being taken from the yard or shop to the required place on the road to remove the weeds, it is evident that better results will be obtained by lifting the weeders from engagement with the ground. In order to accomplish this result and at the same time to provide a construction whereby weeders will be yieldingly held in engagement with the ground when in operation the following is employed:—

By reference now to Fig. 2 it will be seen that rising from the central portion and adjacent to the rear end of the platform 14 is a bracket 82 and journaled in this bracket is a shaft 83 to which is fixed a bell crank lever, the arms of which are designated by the numerals 84 and 85. The arms 84 and 85 are of considerable length, the arm 85 extending rearwardly to a point overlying a cross piece 86 which connects the intermediate portions of the hanger arms 76 and 77, connection between the extremity of the said arm 85 and cross piece 86 being established by means of a link 87, the opposite ends of which are provided with eyes the upper eyes receiving an eye bolt 88 and the lower a rod 89 secured to the cross piece 86. The opposite arm 84 of the bell crank extends substantially vertically upward; the bell crank being operated in a manner to be presently described.

Positioned at the forward end and at the central portion of the platform 14 is an air cylinder 90, in which is slidingly fitted a piston not shown, the latter having a piston rod 91 extending toward the rear end of the platform. The free end of the piston rod 91 is provided with a cross head 92 which is mounted on a guide 93 and pivoted to the cross head 92 is one end of a connecting rod section 94. Straddling the free end portion of the arm 84 of the bell crank is a stirrup 95, and loosely fitted in the stirrup 95 is a connecting rod section 96, one end of the said rod section having an enlarged head (not shown) which limits outward movement of the connecting rod section. The opposite end of the connecting rod section is screw-threaded as shown at 97, and the end of the connecting rod section 94 remote from the cross head 92 is screw-threaded as shown at 98. The sections 94 and 96 are connected by a turnbuckle 99 threaded onto the screw-threaded portions 97 and 98. Encircling the section 96 with its opposite terminals bearing on one end of the turnbuckle and intermediate portion of the stirrup 95 is a helical compression spring 100. With this construction it will be manifest when air is admitted into the cylinder 90 through a valve-controlled cock 101 arranged adjacent to the working end of the cylinder that the piston rod 91 will be moved toward the head end of the cylinder, whereby the bell crank will be rocked and the weeder at the rear end of the device lifted from engagement with the ground. The air supplied to the cylinder 90 may be taken direct from the air line of the engine, a relief valve 102 being located adjacent to the opposite end of the cylinder and serving to permit the air to escape when it is desired to lower the weeder.

By virtue of the loose connection between the section 96 and stirrup 95 it will be evident that a yielding upward movement of the rear weeder will be permitted which will be found advantageous when passing over uneven places in the road, the spring 100 acting to yieldingly hold the weeder in engagement with the ground. The means employed for lifting the side weeders is identical to that just described and as shown in Fig. 3 a pair of brackets 103 and 104 are positioned adjacent to the opposite sides of the platform. The brackets are provided with shafts 105 and 106 upon which are secured bell cranks, the opposite sides of which are designated by the numerals 107 and 108. The arms 108 of the bell cranks extend outwardly from the platform and overlie the medial portions of the cross pieces 60 and 61 carried by the side bars 53 and 55 connection between said arms and cross pieces being established by means of links 109, the opposite ends of which are provided with eyes which receive eye bolts 110 and 111 secured to the extremities of the arms 108 and cross pieces 60 and 61. Transversely disposed air cylinders 112 and 113 are positioned on the opposite side portions of the platform and are provided with piston rods 114 and 115, the inner ends of which have pistons not shown, and the outer ends of which are provided with cross heads 116 and 117. It will be understood that the piston rods 115 and 116 extend in opposite directions and connection between the said cross heads and arms 108 is established by means of rod sections 118 and 119 similar to the rod sections 94 and 96, it being understood that the said rod sections 118 and 119 are connected by turnbuckles 120. The sections 119 are connected with the arms 107 by means of stirrups 121, and encircling the sections 119 and bearing on the stirrups and turnbuckles are the opposite ends of helical compression springs 122. With this construction it will be manifest when air from the train line is admitted to the cylinders 112 and 113 through cocks 123 located adjacent to the working ends of the cylinders that the rods will be forced inwardly, whereby the side weeders will be raised from engagement with the ground, since it will be remembered that the side bars 53 turn on the slide bars 47 and 48 as pivots.

By reference to Fig. 3 it will be seen that the frames carrying the side sweepers are held against lateral movement by means of braces 124 and 125, the opposite ends of which are pivoted to the sides of the platform and side bars 53.

In order to hold the shaft sections 62 and 63 properly positioned during the operation of the side weeders the following construction is employed:

By reference now to Fig. 4 it will be seen that the shaft sections 62 and 63 have their intermediate portions journaled in collars 126 and 127, and extending radially from diametrically opposite points on the collars are pins or trunnions 128. Vertically disposed cylinders 129 extend through the platform 14 and adjacent to the opposite sides thereof and slidingly fitted in these cylinders are piston rods 130. The lower ends of the piston rods are bifurcated and straddle the collars 126 and 127, the said bifurcations being provided with openings to receive the pins 128. The inner ends of the piston rods 130 are provided with pistons 131, and encircling the rods and having their opposite ends bearing on the pistons 131 and working ends of the cylinders are helical compression springs 132. With this construction it will be manifest when the side weeders pass over depressions the springs 132 will be compressed owing to the downward movement of the weeders and shaft sections and will operate to return the shaft sections to their normal positions when the weeders move out of the depressions.

From the foregoing, it is evident that I have provided a device which is comparatively simple in structure and inexpensive in manufacture, embodying few parts and these so arranged that the danger of derangement will be reduced to a minimum.

I claim:—

1. In a track weeder, the combination with a wheeled support; of a pivoted frame, a rotary weeder carried by said frame, an extension hinged to the frame for movement relative to the latter, said extension being provided with a brush located to the rear of the weeder, for the purposes described.

2. In a track weeder the combination with a wheeled support; of a frame pivotally secured to one side of said support, a rotary weeder carried by the frame, an extension hinged to the rear end of the frame for movement relative to the latter, a brush carried by the extension, and a hood carried by the extension and overlying a portion of the weeder.

3. In a track weeder the combination with a wheeled support, a motor arranged on said support, and a shaft driven by said motor; of a weeder positioned beyond one side of the frame to operate on the surface beyond the end of the cross ties of the track, and a shaft having its opposite ends pivoted to the weeder and the said shaft, for the purposes described.

4. In a track weeder the combination with a wheeled support, a motor arranged on said support, and a shaft driven by said motor;

of a weeder positioned beyond one side of the support, a shaft section having its opposite ends universally connected to one end of the weeder and the first-named shaft, and means for yieldingly holding said shaft section against movement relative to the first-named shaft and the weeder.

5. In a track weeder the combination with a wheeled support, a motor arranged in said support, and a shaft driven by said motor; of a rotary weeder positioned beyond one side of the support, a shaft section having its opposite ends connected for universal movement to the first-named shaft and weeder, and a reciprocating member carried by the support and connected with the shaft section serving to yieldingly hold the latter against movement relative to the first-named shaft and weeder.

6. A track weeder comprising a support, a pair of horizontally disposed slide bars adjustably secured on one end of the support, frame members arranged on the opposite sides of said support, each having an elongated side journaled at one end in the outer end of one of said slide bars, and rotary weeders carried by said frame members.

7. A track weeder comprising a wheeled support, a plurality of weeders pivotally connected to one end of the support and positioned to operate between the cross ties on either side of the rails, means for moving said weeders upwardly from engagement with the ground, a plurality of weeders pivotally connected to opposite sides of the support and positioned to operate on the surface beyond the opposite ends of the cross ties of the track, means for moving the last-named weeders upwardly from engagement with the ground and in planes at right angles to the plane of movement of the first-named weeders, and a motor carried by the support for simultaneously rotating all of said weeders and propelling the support.

8. A track weeder comprising a wheeled support, a plurality of weeders pivotally connected to one end of the support positioned to operate between the cross ties on either side of the rails, means for moving said weeders upwardly from engagement with the ground, a plurality of weeders pivotally connected to the opposite sides of the support and positioned to operate on the surface beyond the opposite ends of the cross ties of the track, means for independently moving the last-named weeders upwardly from engagement with the ground and in planes at right angles to the plane of movement of the first-named weeders, and a motor carried by the support for simultaneously rotating all of said weeders and propelling the support.

In testimony whereof I affix my signature in presence of two witnesses.

DANIEL AUGUSTINE CHISHOLM.

Witnesses:
H. B. MURPHY,
HENRY OLSON.